No. 608,807. Patented Aug. 9, 1898.
D. TILDEN.
FRUIT OR FLOWER STEM CUTTER AND HOLDING ATTACHMENT.
(Application filed Sept. 13, 1897.)
(No Model.)
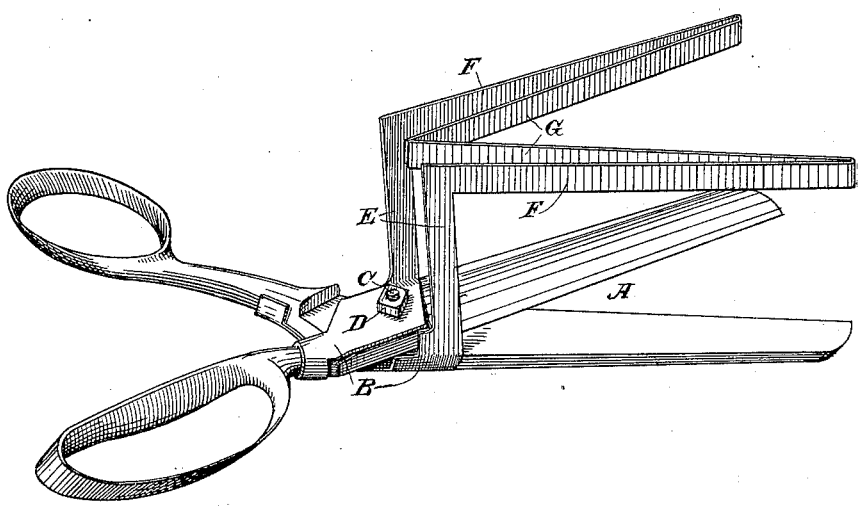
Inventor,
Douglas Tilden

UNITED STATES PATENT OFFICE.

DOUGLAS TILDEN, OF OAKLAND, CALIFORNIA.

FRUIT OR FLOWER STEM CUTTER AND HOLDING ATTACHMENT.

SPECIFICATION forming part of Letters Patent No. 608,807, dated August 9, 1898.

Application filed September 13, 1897. Serial No. 651,457. (No model.)

*To all whom it may concern:*

Be it known that I, DOUGLAS TILDEN, a citizen of the United States, residing in Oakland, county of Alameda, State of California, have invented an Improvement in Fruit or Flower Stem Cutters and Holding Attachments; and I hereby declare the following to be a full, clear, and exact description of the same.

My invention relates to fruit-gathering devices; and it consists in a device removably attachable to any ordinary fruit gathering or pruning shears.

The object of my invention is to provide a convenient and effective means to grasp the stem as it is cut and prevent fruit and flowers from falling while being gathered in such positions as it is not possible or convenient for the gatherer to use one hand to hold the fruit or flower while the other is engaged in applying the shears to cut the stem. It frequently happens that the gatherer has to mount a ladder for the purpose of picking fruit from a tree or flowers growing up the wall of a house or a trellis-work and that when so situated it is necessary for him to use one hand in maintaining his position while he uses the shears in the other to cut the stem of the fruit or flower. In doing this with the ordinary shears the fruit or flower falls to the ground or is caught in the tree or vine and is more or less damaged. My device provides a means for holding the fruit or flower under such circumstances, so that it may be safely placed in any conveniently-disposed receptacle without injury.

The accompanying drawing is a view of a cutter provided with my attachment.

A is an ordinary pair of pruning or fruit-gathering shears with my holding device attached.

B are the body parts of my device, which are suitably fitted to the shears on each side thereof and provided with holes corresponding with the holes in the shears through which the pivoting-bolt C passes. In attaching my device to the shears the bolt C is passed through all these holes and is secured at one end by the nut D and so holds my device in place on the shears.

E are projections extending approximately at right angles from the forward ends of the body parts B and having the fingers F running parallel with the jaws of the shears throughout their length and at such a distance therefrom as to readily admit of the stem of the fruit or flower being seized by the gatherer between the shears and the fingers F. These fingers F gradually approach each other until they meet at their ends opposite to the ends of the shears.

This construction of my device provides a convenient and effective means for holding thick stems of fruit and flowers. In order to hold their stems opposite any point of the cutting edge of the shears, I make the fingers F of double length and bend one-half G of each finger inwardly and back upon itself, so that the parts thus bent back are in elastic contact with each other throughout their length when the shears are closed. When the shears are open, the parts G separate in conformity with the opening of the shears, thus forming a V-shaped aperture adapted to receive a stem of any ordinary dimensions. The resilient character of the metal of which the holder is composed imparts a yielding pressure to the parts G, which assists in holding the stem.

Having thus described my invention, what I claim as new, and desire to secure by Letters Patent, is—

1. A new article of manufacture consisting of a pair of separable metal plates the body portions of which are provided with corresponding holes adapted to receive the single pivoting-bolt of a pair of shears, said plates having projecting portions extending approximately at right angles from the forward ends of the body portions and thence continued parallel with the jaws of the shears and returned upon themselves to form resilient fingers adapted to hold the article to be cut.

2. The combination with a pair of shears, of a pair of metal plates each having a body portion adapted to be fitted against one of the sides of the shears and each having a hole through which the pivoting-bolt of the shears is passed, to secure the jaws of the shears and the plates, each of said plates extending at approximately a right angle from the forward end of its body portion and thence extending forwardly parallel with the jaws of the shears and returned in converging lines.

In witness whereof I have hereunto set my hand.

DOUGLAS TILDEN.

Witnesses:
   GEO. H. STRONG,
   S. H. NOURSE.